3,173,484
FRACTURING PROCESS EMPLOYING A HETEROGENEOUS PROPPING AGENT
Jimmie L. Huitt, Glenshaw, and John Papaila, Logans Ferry Heights, Pa., assignors to Gulf Research & Development Company, Pittsburgh, Pa., a corporation of Delaware
No Drawing. Filed Sept. 2, 1958, Ser. No. 758,585
2 Claims. (Cl. 166—39)

This invention relates to a method for treating wells. It is more specifically concerned with the art of fracturing formations, and still more particularly with a process for hydraulically fracturing formations with the aid of solid propping agents.

Within recent years hydraulic fracturing processes have been employed to create artificial fractures adjacent a producing well to increase the productivity of the fluid bearing formation. In general, such processes consist in forcing a fracturing fluid into a producing well in sufficient volume and under sufficient pressure to rupture the formation. The fracturing fluid is forced to enter the induced crack and extend the fracture for substantial distances into the formation. After the injection pressure has been released the fracture produced in the formation tends to close due to the weight of the overburden. In order to keep the fracture open, granular insoluble solids such as sand are usually suspended in the fracturing medium. The granular solids upon being carried into the fracture act as props and hold open the fracture after the injection pressure is released.

While the above-described fracturing process has received considerable commercial application, certain disadvantages inure to this practice which limit its effectiveness. Among these are that the particulated solids comprising the propping agent are not always distributed evenly throughout the induced fracture but rather tend to concentrate and agglomerate into a close packed mass in certain areas of the fracture. As a consequence of the tendency of the particulated solids to agglomerate within the fracture in this manner, the permeability of the fracture is seriously reduced due to the inadequacy of the interstitial space between the solid particles for passage of formation fluids.

Accordingly, it is an object of the invention to provide an improved method for hydraulically fracturing an earth formation by means of a liquid carrying suspended granular solids whereby the foregoing disadvantages are overcome.

The process of the present invention comprises introducing into an earth formation a fluid under sufficient pressure to fracture said formation and displacing into the induced fracture the said fracturing fluid including a propping agent comprised of at least two solid materials both of which assist initially in maintaining open the fracture and subsequently removing from the fracture at least one of the solid materials comprising the propping agent while leaving at least one of the solid materials comprising the propping agent in the fracture thereby providing greater spacing between the remaining solid propping particles resulting in a highly permeable flow channel for formation fluids.

In accordance with the invention a suitable low-penetrating fluid is injected into a producing formation, such as an oil formation, under sufficient pressure to cause a fracture. The fracturing fluid carrying in suspension a propping agent composed of two or more solid materials of dissimilar nature is displaced into the induced fracture wherein the solid particles are deposited to serve as props to support the overburden upon release of the injection pressure. Thereafter one of the solid materials comprising the propping agent is selectively removed from the fracture leaving the remaining solid materials within the fracture to maintain the fracture open. Removal of one solid component of the propping agent from within the fracture is accomplished by a variety of methods depending upon the physical and chemical properties of the various solid materials comprising the propping agent. Upon removal of one constituent of the propping agent voids or flow channels are produced within the fracture for passage of well fluids and results in the fracture having a desirably high flow capacity.

In one preferred embodiment of the invention, a fracturing fluid carrying in suspension a propping agent composed of two or more solid materials having dissimilar solubility characteristics in a particular solvent is displaced into a fractured subterranean formation to serve as props for the fracture. Subsequently, one of the solid materials is removed from the fracture by permitting it to dissolve in a solvent liquid. The solvent employed can be a fluid which is naturally present in the formation or one deliberately injected therein.

The composite or heterogeneous propping agent encompassed in one embodiment of the invention is composed of at least one solid material which is soluble in a liquid naturally occurring within the earth formation or in a solvent deliberately injected therein and at least one other solid material which is insoluble or inert to either type of solvent. Any of the materials commonly employed in the art as propping agents can be employed as the insoluble component in accordance with the invention. Such materials include for example, ceramic materials, metal chips, metallic oxides such as aluminum oxide, wood chips, and the like. Sand because of its hardness, cheapness and general availability is a preferred material for use as the insoluble component of the propping agent of the invention.

The soluble material which is employed as one component of the propping agent of the invention is a solid material which is soluble in fluids such as petroleum or water which are encountered within the earth formation or in other non-indigenous solvents such as for example hydrochloric or other inorganic acids which are deliberately injected into the formation. It is preferred to employ as the soluble constituent solid materials which dissolve in fluids normally encountered in earth formations as this avoids the necessity of an additional solvent injection step. In this connection, the soluble component of the propping agent should be one which dissolves slowly in the formation fluids to assure proper dispersion of the insoluble component of the propping agent throughout the fracture. The soluble components before dissolution occupies a certain volume within the fracture which results in greater dispersion of the insoluble particles which in turn reduces the tendency of the insoluble particles to agglomerate. Thus, for optimum results the soluble constituent of the propping agent should not be completely dissolved before the injection pressure of the fluid creating the fracture is released. Accordingly, solid materials which are rapidly dissolved by contact with formation fluids are generally to be avoided. Of course, where the soluble component of the propping agent is one which is substantially unaffected by contact with formation fluids but which dissolves in a solvent which is deliberately introduced into the formation in accordance with the invention, the rate of solution of the soluble substance in the solvent is of lesser importance inasmuch as the time of introduction of the solvent can be delayed as desired.

Representative solid materials which are slowly soluble in petroleum oils and which are of particular use as one component of the propping agent in treating oil bearing formation include such materials as naphthalene, anthracene, petroleum asphalt, gilsonite, hard waxes such as flaked or granulated beeswax, carnauba wax, microcrystalline hydrocarbon wax, hydrogenated animal and vegetable oils, resins such as abietic acid, coumerone-indene resins and the like. Another group of materials suitable in accordance with the invention as the soluble component of the propping agent are those substances which are soluble or decomposable in water such as a salt, preferably one which is commercially available at low cost, as for example, rock salt, sodium sulphate, sodium carbonate crystals and the like. Thus, it is apparent that various classes of solid substances can be employed as the soluble component of the propping agent of the invention, and any number of specific materials falling within each class will be readily apparent to those skilled in the art.

In another embodiment of the invention the components of the propping agent are selected from solid materials having substantially different melting points. Removal of one of the solid materials from the fracture in this instance is accomplished by applying heat in the vicinity of the fracture to cause the lower melting solid component to melt thus facilitating its removal from the fracture in the liquid state. The heat within the well can be provided by any convenient means, for example, an electric heater can be employed or if desired, chemical means as is known in the art can be employed for producing heat. Thus, when employing as one component of the propping agent solid materials having relatively low melting points such as for example, granulated beeswax, carnauba wax, hydrogenated animal and vegetable oils etc., heating can be employed as the means of removing these materials from the fracture after the overburden pressure has reached its substantially maximum limit. Any solid material having a relatively high melting point which is substantially unaffected by the heating required to melt the one component of the propping agent can be utilized as the inert component of the propping agent which remains within the fracture to maintain it open after removal of the lower melting component of the propping agent. Thus, materials such as sand, metal chips, wood chips, ceramic materials and the like are suitable as the inert component of the propping agent.

In a further embodiment of the invention, the solids comprising the propping agent are selected with a view to their chemical reaction with certain materials which are suitably introduced into the formation. In accord with this embodiment of the invention, one component of the propping agent comprises a solid which is capable of reacting within the formation with a material introduced therein to form either liquid or gaseous reaction products which are then removed from the well. Representative of such materials are crushed limestone particles, metals such as aluminum or magnesium and the like, which undergo reaction with acids such as aqueous hydrochloric acid with the production of a liquid capable of being recovered from the well along with the well effluent during subsequent production.

The various materials comprising the propping agent of the invention can be employed therein in a variety of forms. Thus, the composite propping agent can comprise a thoroughly commingled mixture of discrete particles of the various components. The particles of each component should be substantially the same size in order to insure that all of the particles comprising the propping agent effectively support the overburden. Alternatively, the soluble or otherwise removable constituent and the inert or non-removable constituent can be bonded to one another to form the propping agent. Bonding of the various components of the propping agent is accomplished by any suitable means as for example by glueing particles together or in certain instances by employing the removable component as a coating on the inert component as would be obtained for example by coating sand particles with a suitable coating of a petroleum asphalt. In general, bonding of the various constituents of the propping agent to one another is preferred for homogeneity and to avoid premature separation of the constituents within or prior to introduction in the fracture. In any event, the size of the solid particles comprising the propping agent should be such that they will pass into the cracks or fractures produced in the earth formation. In general, the particle size ranges from about 4 to about 80 mesh U.S. sieve. The optimum particle size can be readily determined in each instance according to the conventional principles applied to fracturing.

The amounts of the composite propping agent including both the removable and inert components, employed in fracturing fluids will vary over relatively wide limits in accordance with conventional practice. Thus, for instance, the propping agents of the invention will be employed in amounts of from about 0.5 pound per gallon of fracturing fluid to 10 pounds per gallon or more.

The proportion of the removable component to inert or non-removable component in the propping agent can likewise be varied over relatively wide limits depending upon the overburden pressure and the geological characteristics of the formation. A sufficient amount of inert component is employed in each instance to support the overburden after removal of the removable component. In actual use, the ratio of removable component to inert component will generally be maintained within the range of from 9:1 to 1:9.

The composite propping agents included within the invention can be employed in place of conventional propping agents with no change in fracturing technique. The propping agents can be used with any of the conventional fracturing fluids as long as the fluid does not dissolve either component of the propping agent prior to placement within the formation. The choice of materials for use as the propping agent can be easily varied to accommodate the fracturing fluid in this respect and thus either oil or water base fracturing fluids which may or may not contain soap or other thickening agents can be employed to suspend the propping agents and to carry them into the formation fracture.

The following experimental operations and data illustrate the advantages obtained by the use of the propping agents of the invention.

Sand particles of about 4 to 6 mesh were coated with a film of a petroleum asphalt. The asphalt film was applied by dipping the sand articles into molten ashalt and removing the sand particles from the molten asphalt and placing in water to cool the asphalt film and harden it. The average thickness of the asphalt coating was about 0.01 inch.

A simulated fracture was achieved utilizing two square brass plates which were found to offer approximately the same resistance to embedment of particles as did a typical hard earth formation. The surface of the plates were roughened by repeated crushing of sand grains between them to simulate a fractured surface. The brass plates were fitted with side and end seals, a flow entrance and exit and pressure taps to form a flow cell. Propping agents were tested by placing monolayers of the propping agents in the flow cell in a somewhat random pattern that was controlled to the extent that no direct flow paths across the flow cell existed. The flow cell was then assembled and placed in a hydraulic press where the plates were forced together to simulate a desired overburden pressure. Water was flowed through the cell and flow capacity of the fracture calculated from the volume of water passing through the fracture and the pressure differential existing in the flow path from the inlet to outlet. This procedure simulates a fracture which is the principal conduit for the formation fluids to the well bore.

Utilizing this procedure, the asphalt coated sand particles were placed in the flow cell and water flowed through the cell. The flow capacity of the cell was determined as previously described and found to be 68,000 millidarcy feet. After determination of the original flow capacity, a crude petroleum oil was passed through the flow cell for a period of approximately 2 hours. The crude petroleum oil passing through the flow cell served to dissolve the asphalt coating leaving the sand particles within the simulated fracture. Following this procedure, water was again flowed through the cell and the flow capacity was again determined. The flow capacity was now found to be 120,000 millidarcy feet.

Employing the same procedure as above, the following data was obtained utilizing the propping agents indicated.

*Table I*

| Propping Agent | | Volume, percent | | Temperature, °F. | Solvent Contact Time (hours) | Initial Flow Capacity (millidarcy feet) | Final Flow Capacity (millidarcy feet) |
| --- | --- | --- | --- | --- | --- | --- | --- |
| Insoluble Component A | Soluble Component B | A | B | | | | |
| Steel Balls | Gilsonite | 25 | 75 | 100 | 2 | 15,100 | 229,000 |
| Do | do | 34 | 66 | 115 | 3.5 | 40,800 | 926,000 |
| Do | do | 50 | 50 | 120 | 1.6 | 25,600 | 912,000 |
| Do | do | 75 | 25 | 125 | 2 | 9,500 | 47,000 |
| Do | Naphthalene | 50 | 50 | 70 | 3 | 750,000 | 2,500,000 |
| Do | Rosin | 50 | 50 | 145 | 4 | 7,500 | 89,000 |

Thus, as seen from the above results, dissolution of the soluble component of the propping agent results in a substantial increase in flow capacity and illustrates the advantages of the composite propping agents of the invention.

In a specific embodiment of the invention a packer is located in the well on the tubing to isolate and confine a selected oil producing zone which is to be fractured. A viscous low-penetrating fracturing fluid consisting of water to which is added a gelling agent is then pumped into the well. The fracturing fluid is continuously pumped into the well until a sufficient pressure is reached such that a fracture occurs, which condition is usually indicated by a sudden decrease in pump pressure. After the fracture occurs, a propping agent consisting of an unbonded mixture of sand particles of about 8 to 10 mesh size and naphthalene particles of about 8 to 10 mesh are incorporated into the fracturing fluid. The propping agent consisting of the mixture of sand and naphthalene particles is mixed into the fracturing fluid as it is pumped into the well at a rate to provide about three pounds of propping agent per gallon of fracturing fluid. The fracturing fluid containing the propping agent is continuously pumped into the fracture to extend the fracture and to deposit the propping agent therein. After the well has been shut in for a sufficient time, to permit the fracturing fluid to revert to a state of high fluidity, the fluid is withdrawn from the well as part of the well effluent during subsequent production. The sand and naphthalene particles are deposited within the fracture to support the overburden. The naphthalene particles gradually dissolve in the oil present in the formation thereby increasing the void space in the flow channels and resulting in additional cross sectional flow area which gives a fracture of high fluid carrying capacity.

It is to be understood that the foregoing description of a specific embodiment of the invention is by way of illustration only and is not intended to limit the invention which in its broad aspect involves the use of a propping agent composed of at least two solid materials of dissimilar nature which permits the selective removal of one solid material from the fracture while leaving another solid material within the fracture. It is apparent that various changes can be made in the operational and manipulative techniques of the hydraulic fracturing process without departing from the invention. Moreover, the principles of the invention can be applied to hydraulic fracturing operations which are combined with other types of treatments associated with hydraulic fracturing. Furthermore, the principles of the invention can be applied to the treatment of injection and disposal wells.

Those modifications and equivalents which fall within the spirit of the invention and the scope of the appended claims are to be considered part of the invention.

We claim:

1. A process for treating a subterranean formation penetrated by a well bore which comprises forcing a fracturing fluid down said well and into said formation under sufficient pressure to fracture said formation, displacing into said fracture at least part of said fracturing fluid including a solid propping agent suspended therein, depositing the propping agent in the fracture, the said propping agent being composed of discrete particles of each at least two solid materials having different melting points, the particles of all of the solid materials comprising the propping agent being of substantially the same range of sizes, subsequently applying heat in the vicinity of the fracture to cause the lower-melting point solid component of the propping agent to melt, and removing the melted component of the propping agent from the formation while leaving another of the said solid materials within the fracture to maintain a highly permeable channel for passage of fracture fluids.

2. A process as set forth in claim 1 in which the lower melting point solid component of the propping agent constitutes 10 to 90 percent of the propping agent.

References Cited in the file of this patent

UNITED STATES PATENTS

| 2,645,291 | Voorhees | July 14, 1953 |
| 2,667,224 | Howard | Jan. 26, 1954 |
| 2,681,704 | Menaul | June 22, 1954 |
| 2,689,009 | Brainerd et al. | Sept. 14, 1954 |
| 2,699,212 | Dismukes | Jan. 11, 1955 |
| 2,711,392 | Irwin | June 21, 1955 |
| 2,734,861 | Scott et al. | Feb. 14, 1956 |
| 2,754,910 | Derrick et al. | July 17, 1956 |
| 2,788,072 | Goodwin | Apr. 9, 1957 |
| 2,803,306 | Hower | Aug. 20, 1957 |
| 2,823,753 | Henderson et al. | Feb. 18, 1958 |
| 2,846,011 | Miller | Aug. 5, 1958 |
| 2,879,847 | Irwin | Mar. 31, 1959 |

OTHER REFERENCES

Earlougher, R.C., et al.: Sequestering Agents for Prevention of Scale Deposition in Oil Wells, The Journal of Petroleum Technology, vol. 9, pp. 17–20, April 1957, TN 860J6.

UNITED STATES PATENT OFFICE
CERTIFICATE OF CORRECTION

Patent No. 3,173,484                                                 March 16, 1965

Jimmie L. Huitt et al.

It is hereby certified that error appears in the above numbered patent requiring correction and that the said Letters Patent should read as corrected below.

Column 4, line 48, for "articles" read -- particles --; column 6, lines 45 and 46, for "formation" read -- fracture --; line 48, for "fracture" read -- formation --; same column 6, after line 67, insert the following reference:

2,975,834     West et al.-------------Mar. 21, 1961

Signed and sealed this 21st day of September 1965.

(SEAL)
Attest:

ERNEST W. SWIDER                                   EDWARD J. BRENNER
Attesting Officer                                       Commissioner of Patents